US010059072B2

(12) United States Patent
Hannig

(10) Patent No.: US 10,059,072 B2
(45) Date of Patent: Aug. 28, 2018

(54) METHOD FOR PRODUCING A DECORATED WALL OR FLOOR PANEL

(71) Applicant: AKZENTA PANEELE + PROFILE GMBH, Kaisersesch (DE)

(72) Inventor: Hans-Jürgen Hannig, Bergisch Gladbach (DE)

(73) Assignee: Akzenta Paneale + Profile GmbH, Kaisersasch (DE)

( * ) Notice: Subject to any disclaimer, the term of this patent is extended or adjusted under 35 U.S.C. 154(b) by 7 days.

(21) Appl. No.: 14/419,798

(22) PCT Filed: Jul. 18, 2014

(86) PCT No.: PCT/EP2014/065509
§ 371 (c)(1),
(2) Date: Feb. 5, 2015

(87) PCT Pub. No.: WO2015/011049
PCT Pub. Date: Jan. 29, 2015

(65) Prior Publication Data
US 2016/0136913 A1 May 19, 2016

(30) Foreign Application Priority Data

Jul. 22, 2013 (EP) ..................................... 13177453
Aug. 9, 2013 (DE) ........................ 10 2013 108 671

(51) Int. Cl.
| | | |
|---|---|---|
| B29C 37/00 | (2006.01) |
| B29D 99/00 | (2010.01) |
| B44C 5/04 | (2006.01) |
| B27N 3/08 | (2006.01) |
| B27N 3/18 | (2006.01) |
| E04F 13/08 | (2006.01) |
| E04F 15/02 | (2006.01) |
| E04F 15/04 | (2006.01) |
| E04F 15/10 | (2006.01) |
| B29K 1/00 | (2006.01) |
| B29K 23/00 | (2006.01) |
| B29K 27/06 | (2006.01) |
| B29K 105/00 | (2006.01) |

(52) U.S. Cl.
CPC ............. *B29D 99/001* (2013.01); *B27N 3/08* (2013.01); *B27N 3/18* (2013.01); *B29C 37/0025* (2013.01); *B44C 5/04* (2013.01); *E04F 13/0866* (2013.01); *E04F 15/02038* (2013.01); *E04F 15/04* (2013.01); *E04F 15/107* (2013.01); *B29K 2001/00* (2013.01); *B29K 2023/06* (2013.01); *B29K 2023/08* (2013.01); *B29K 2023/12* (2013.01); *B29K 2023/14* (2013.01); *B29K 2027/06* (2013.01); *B29K 2105/0085* (2013.01); *B29K 2105/251* (2013.01); *B29K 2105/256* (2013.01); *E04F 15/102* (2013.01)

(58) Field of Classification Search
CPC ..... B29C 37/0025; B29C 43/22; B29C 43/24; B29C 43/228; B29C 43/28; B29C 43/30; B29C 43/305; B29C 70/40; B29C 70/58; B29C 70/66
See application file for complete search history.

(56) References Cited

U.S. PATENT DOCUMENTS

| | | | |
|---|---|---|---|
| 3,938,927 A | | 2/1976 | Brinkmann et al. |
| 5,057,175 A | * | 10/1991 | Ashton ................. B29C 43/228 156/202 |
| 6,440,538 B1 | | 8/2002 | Ungar |
| 6,773,799 B1 | | 8/2004 | Persson et al. |
| 7,037,865 B1 | * | 5/2006 | Kimberly ............... B29C 70/60 264/103 |
| 8,557,898 B2 | | 10/2013 | Fukushima et al. |
| 2003/0077471 A1 | * | 4/2003 | Tucker .................. B29C 55/005 428/515 |
| 2010/0055420 A1 | | 3/2010 | Vermeulen |
| 2011/0003136 A1 | | 1/2011 | Schmidt et al. |
| 2011/0167744 A1 | * | 7/2011 | Whispell ................. E04F 15/02 52/309.1 |
| 2011/0268937 A1 | | 11/2011 | Schacht et al. |
| 2013/0147090 A1 | | 6/2013 | Schromm et al. |
| 2013/0183506 A1 | | 7/2013 | Vermeulen |

FOREIGN PATENT DOCUMENTS

| | | |
|---|---|---|
| CL | 31818 | 10/1980 |
| CL | 42995 | 1/2002 |
| (Continued) | | |

OTHER PUBLICATIONS

International Search Report, PCT/EP2014/065509, dated Oct. 16, 2014, 3 pages.
Written Opinion, PCT/EP2014/065509, dated Oct. 16, 2014, 7 pages.
International Preliminary Report on Patentability, PCT/EP2014/065509, dated Jan. 26, 2016, 12 pages.
Abstract of JP2006142496; Jun. 8, 2006.
Abstract of JPH09-314712; Dec. 9, 1997.
Abstract of JPH11-279416; Oct. 12, 1999.

(Continued)

*Primary Examiner* — Christina Johnson
*Assistant Examiner* — Xue Liu
(74) *Attorney, Agent, or Firm* — Senniger Powers LLP

(57) ABSTRACT

A method for producing a decorated wall or floor panel, comprising placing a pourable granulate carrier material between two belt-like conveyors; molding the carrier material under the influence of temperature while forming a web-like carrier; compressing the carrier; treating the carrier under the influence of temperature and pressure by use of a dual-belt press; cooling the carrier; applying a decor simulating a decorative template onto at least a portion of the carrier; and applying a protective layer onto at least a portion of the decor. A wall or floor panel that is particularly stable, adaptable and high quality. An apparatus comprising elements for performing this method. A wall or floor panel comprising a plate-shaped carrier comprising a connecting element edge profile.

16 Claims, 4 Drawing Sheets

(56) References Cited

FOREIGN PATENT DOCUMENTS

| | | |
|---|---|---|
| DE | 10001148 A1 | 7/2001 |
| DE | 102007063261 A1 | 6/2009 |
| EP | 2402155 A1 | 1/2012 |
| ES | 475440 A2 | 11/1978 |
| JP | H09-314712 A | 12/1997 |
| JP | H10-211667 A | 8/1998 |
| JP | H11-279416 A | 10/1999 |
| JP | 2006142496 A | 6/2006 |
| JP | 2007507565 A | 3/2007 |
| JP | 2010-162784 A | 7/2010 |
| WO | WO 2008122668 A1 * 10/2008 | ............... B27N 3/06 |
| WO | 2012136188 A1 | 10/2012 |
| WO | 2013092963 A2 | 6/2013 |

OTHER PUBLICATIONS

Abstract of JPH10-211667; Aug. 11, 1999.
Abstract of JP2010-162784; Jul. 29, 2010.
Abstract of JP2007507565; Mar. 29, 2007.
English Language Machine Translation of CL 31818, 1 page.
ESpace English Language Translation of EP0012700A1, 5 pages.
ESpace English Language Translation of ES475440A2, 5 pages.

* cited by examiner

METHOD FOR PRODUCING A DECORATED WALL OR FLOOR PANEL

REFERENCE TO RELATED APPLICATIONS

This application is a U.S. national stage application of International Patent Application No. PCT/EP2014/065509, filed Jul. 18, 2014, and claims the benefit of priority of European Application No. 13177453.1, filed Jul. 22, 2013 and German Application No. 102013108671.3, filed Aug. 9, 2013, the entire disclosures of which are incorporated herein by reference.

FIELD OF THE INVENTION

The present invention relates to a method for producing a decorated wall or floor panel, an apparatus for producing such a decorated wall or floor panel and a wall or floor panel produced according to such a method.

BACKGROUND OF THE INVENTION

Decorated plates are known per se, wherein the term wall panel also includes panels which are suitable as a ceiling lining. They normally consist of a carrier or a core of a solid material such as a wood-based material, which on at least one side is provided with a decorative layer and a top layer and optionally with further layers, for example, a wearing layer disposed between the decorative and the top layers. The decorative layer is usually a printed paper which is impregnated with a resin. The top layer and the remaining layers are usually made of a resin, too.

Herein, the production of the panels, such as the core or the carrier, in some circumstances can offer potentials for improvements.

SUMMARY OF THE INVENTION

Thus, it is an object of the present invention to provide an improved method for producing decorated wall or floor panels.

This object is achieved by a method comprising steps (a) through (k) as discussed below, an associated apparatus, and a panel comprising a plate-shaped carrier which has an edge having a connecting element profile adapted for connection of two panels to each other produced by this method.

Thus, the invention proposes a process for producing a decorated wall or floor panel comprising the steps of:
a) providing a pourable carrier material, in particular a granulate material,
b) placing the carrier material between two belt-like conveyor means,
c) molding the carrier material under the influence of temperature, and forming a web-like carrier,
d) compressing the carrier,
e) treating the carrier under the influence of temperature and pressure by use of a dual-belt press,
f) cooling the carrier,
g) optionally applying a decorative subsurface onto at least a portion of the carrier,
h) applying a decor simulating a decoration template onto at least a portion of the carrier,
i) applying a protective layer onto at least a portion of the decor,
j) optionally texturing the protective layer in order to introduce pores, and/or the edge region of the carrier in order to form connecting elements, and
k) optionally treating the carrier for inducing an electrostatic discharge prior to any one of the abovementioned process steps.

DETAILED DESCRIPTION OF PREFERRED EMBODIMENTS

Figure 1:
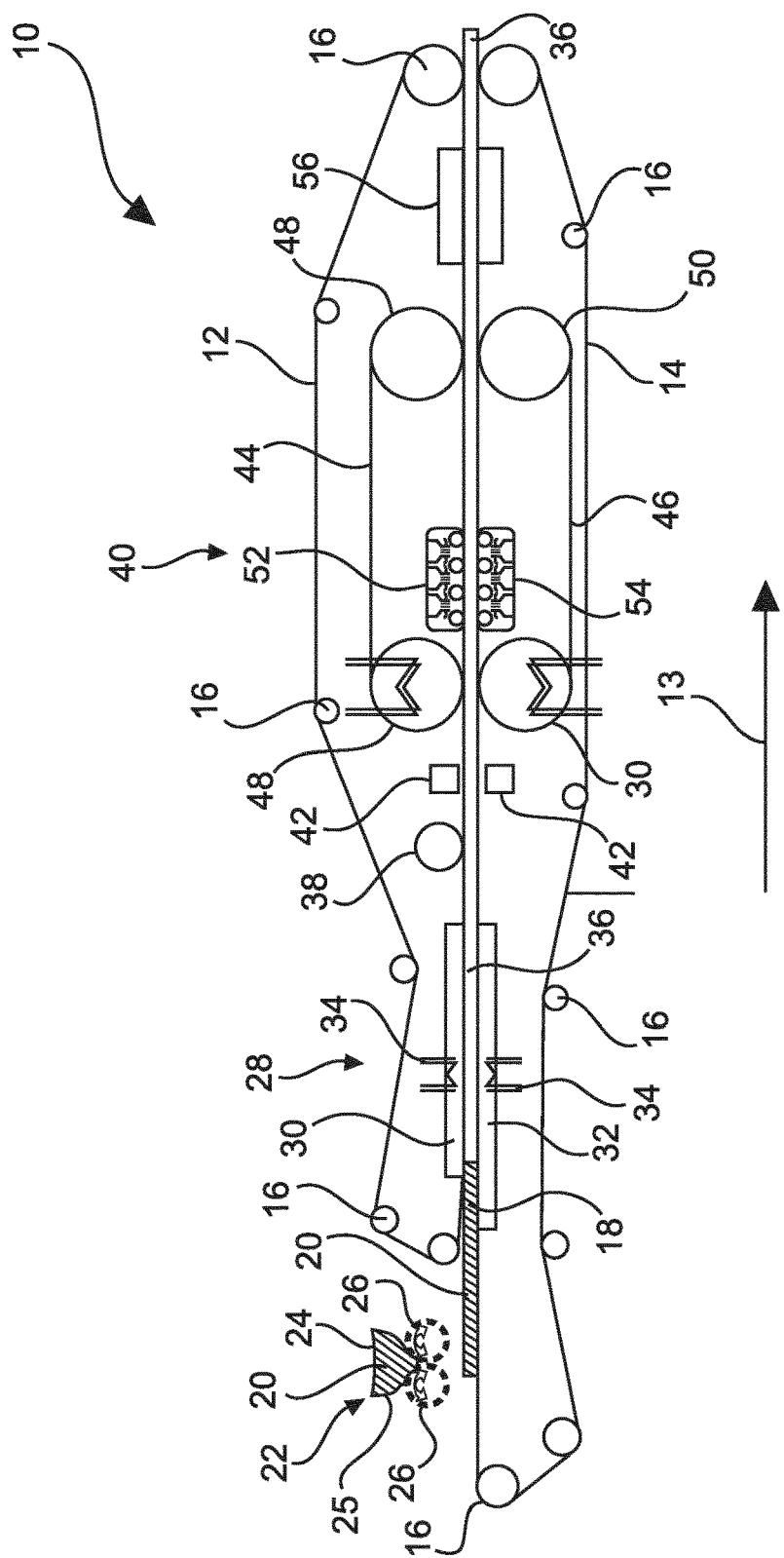
FIG. 1 shows schematically an apparatus according to the invention for performing a part of the method according to the invention.

The term "decorative wall or floor panel" or "decorative panel" in the sense of the invention in particular means wall, ceiling, door or floor panels comprising a decor simulating a decoration template applied onto a carrier plate. Decorative panels are used in a variety of ways both in the field of interior design of rooms and for decorative cladding of buildings, for example in exhibition stand construction. One of the most common uses of decorative panels is their use as a floor covering. Herein, the decorative panels often comprise a decor intended to replicate a natural material.

Examples of such replicated natural materials or decoration templates are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Accordingly, a "decoration template" in the sense of the present invention in particular means such an original natural material or at least a surface of such a material which is imitated or replicated by the decor.

A "pourable" material in particular means a material which can be applied onto a substrate by a pouring or scattering process. The material may be provided as fluid or in particular as a pourable solid.

A "granulate material" or "granular material" means a solid or a head of a solid comprising or consisting of a plurality of solid particles, such as grains or beads. Here by way of example but not limited hereto grainy or powdery materials can be mentioned.

A "carrier" in particular can be understood as a layer serving as a core or as a base layer in a finished panel, which in particular includes a natural material such as a wood-based material, a fibrous material or a material comprising plastic. For example, the carrier can already provide or contribute to a suitable stability for the panel.

Herein, a "web-like carrier" can be understood as a carrier which, for example, in its manufacturing process has a web-like shape and thus a length which is substantially greater than its thickness or width, wherein its length may be greater than 15 meters.

Herein, the term "plate-shaped carrier" in the sense of the present invention can be understood as a carrier which is formed by separation from the web-like carrier and is formed in the shape of a plate. The plate-shaped carrier can already define the shape and/or size of the panel to be produced. However, the plate-shaped carrier can also be provided as a large plate. A large plate in the sense of the invention in particular is a carrier whose dimensions several times exceed the dimensions of the final decorative panels, and which is cut during the course of the manufacturing process into a corresponding plurality of decorative panels, for example by sawing, laser or water jet cutting. For example, the large plate may correspond to the web-like carrier.

Wood-based materials in the sense of the invention in addition to solid wood materials are materials such as cross-laminated timber, glue-laminated timber, blockboard, veneered plywood, laminated veneer lumber, parallel strand lumber and bending plywood. In addition, wood-based materials in the sense of the invention are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the invention. Moreover, cork represents a wood-based material in the sense of the invention.

In the sense of the invention the term "fiber materials" means materials such as paper and non-woven fabrics on the basis of plant, animal, mineral or even synthetic fibers as well as cardboards. Examples are fiber materials on the basis of plant fibers and in addition to papers and non-woven fabrics made of cellulose fibers boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

It could surprisingly be shown that by means of the method described above it is possible to combine a particularly advantageous production in particular of a carrier of a wall or floor panel with materials which are particularly preferred for producing the carrier of the panel due to their outstanding properties. Then by combining the abovementioned process steps a production process in particular for a carrier with outstanding materials of a decorated wall or floor panel with an improved efficiency can be provided, which process, moreover, allows the production of highly adaptable and very stable panels. Thus, panels can be produced in a simple way which can comprise preferred properties.

The method for producing a wall or floor panel comprises the following process steps.

First, in accordance with the present method a carrier or a core is produced. The method described above comprises for this purpose according to process step a) initially providing a pourable carrier material. The carrier material is used as a basis for the production in particular of plate-shaped carriers for panels. It can, for example, be present as a uniform material or as a mixed material of two or more materials. Herein, the carrier material or at least a constituent of the carrier material should have a melting point or a softening point, in order to shape the carrier material in a further process step by the influence of heat, as explained in detail below. In a particularly advantageous manner the carrier material can be provided as pourable solid or as granulate material, wherein the granulate material dependent on the material used, for example, may have a particle size in the range of ≥100 µm to ≤10 mm. This allows for an easy storage and also a particularly good adaptability to a desired material composition. In particular in a granular form a particularly homogeneous mixture of different components can be produced, wherein a particularly defined mixture with an accurately adjustable composition can be obtained. By way of example so-called dry blends can be used, i.e. dry plastic powders with additives. In addition, a granulate material in particular in the above described size range can be spread very homogeneously and also very defined onto a subsurface, such that a carrier with a highly defined property profile can be produced. Herein, a preferred bulk or distribution of the carrier material can include a deviation of the bulk density of 5%, in particular of 3%.

According to process step b) the pourable, in particular granular carrier material is disposed between two belt-like conveyor means. In detail, a lower belt-like conveyor means is moved revolvingly and at a defined distance from the lower conveyor means an upper belt-like conveyor means is moved revolvingly. Thus, the carrier material can be applied onto the lower conveyor means and then be constrained by the lower and the upper conveyor means. Herein, by means of an exact control a lateral constraint can be dispensed with. By means of the two conveyor means, the carrier material can be carried to or through individual processing stations and be processed into a carrier. Furthermore, the carrier material can already be pre-formed in this process step. Thus, the belt-like conveyor means may have two functions, namely that of a transport means and that of a mold.

Herein, the belt-like conveyor means can at least partially be made of Teflon or polytetrafluoroethylene (PTFE). For example, the belts can be formed entirely of polytetrafluoroethylene, or belts may be used which are provided with an outer coating of polytetrafluoroethylene. In the latter case, for example, glass fiber reinforced plastic belts may be used. By means of this kind of conveyor means due to the anti-adhesion properties of this material a particularly defined, for example, smooth surface of the produced carrier can be formed. Thus, it can be prevented that the conveyed carrier material adheres to the conveyor means and thus adversely affects the surface structure directly or by adherent material in a next cycle. In addition, polytetrafluoroethylen also at high temperatures is resistant against chemicals as well as against decomposition, such that not only an easy temperature treatment of the carrier material is possible but, moreover, the conveyor means are stable for a long period. In addition, the carrier material may be freely selected.

Herein, the discharge of the carrier material according to process step b) may be implemented in particular by means of one or a plurality of spreading heads, which can discharge the carrier material in a defined way. With respect to the spreading heads these can, for example, be part of a spreading aggregate and comprise at least one rotating spreading roller. For example, a funnel may be provided which discharges the material to be discharged onto the spreading roller in a defined way. In this case, a doctor blade may further be provided which sweeps the material into recesses of the roller. Subsequently the material can be discharged from the spreading roller by use of a rotating brush roll, wherein the material hits against a baffle and slides from there onto the conveyor means. In order to control the spreading width further a spreading width adjustment may be provided. In this embodiment a particular homogeneous discharge of the carrier material can be implemented, which equally results in a homogeneous carrier of specified quality.

For example, one spreading head or two, three or more spreading heads may be provided. As a result, the carrier can be tailored in a particular simple manner, for example by providing a desired material mixture. In this embodiment, the mixture can be easily adjusted during the manufacturing process or between two batches, so that a particularly great variability can be ensured. In addition, by means of a different configuration of the individual spreading heads a mixture for the carrier can be produced immediately prior to the processing so that a negative influence of the various components relative to each other and an accompanying reduction in quality of the produced carrier can be prevented.

In a further step according to process step c) the carrier material disposed between the belt-like conveyor means is subsequently molded under the influence of temperature or heat. In this process step due to temperature or heat the carrier material or at least a part thereof is melted or softened, whereby, for example, the granulate material becomes moldable. In this state it can homogeneously fill the receiving space formed between the conveyor means and thus form a web-like carrier, which may be further processed.

The thus formed web-like carrier then can be compressed in accordance with process step d). This process step may in particular be implemented in a suitable press or roller. Thus, here a first compressing of the web-like carrier takes place. In this step, the carrier can substantially achieve its desired thickness, such that in the following processing steps only a slight compression is necessary and the further steps, thus, may be implemented very smoothly, as will be explained in detail below. Herein, it can in particular be ensured that the temperature of the carrier is cooled down sufficiently, such that a suitable compressibility can be achieved while obtaining the desired result.

In a further process step e) the carrier is now processed further under the influence of temperature or heat and pressure, wherein this step is performed by use of a dual-belt press. In this process step in particular the surface properties of the carrier can be adjusted. For example, in this process step in particular the surface can smoothened. To this end, the previously compressed carrier can be treated under the influence of temperature and pressure, wherein in particular a low pressure can be selected such that this second compression takes place only in a very small range. By way of example, a compression in a range of ≤5%, in particular ≤3% of the total thickness of carrier can be carried out prior to the compression. Thus, the configuration of the processing device in this process step can be selected in particular as a function of a desired adjustment of the surface properties, which can be particularly smooth.

Here, in particular the use of a dual-belt press can be advantageous, since with such a press particularly smooth compression steps are possible and also the surface quality can be adjusted particularly effective and defined. Further, in particular the use of a belt press allow for high line speeds, such that the whole process enables a high throughput.

For example, such a belt press which usually has a fairly long processing space in the conveying direction of the carrier can comprise a plurality of heating zones, which may allow a temperature profile and, therefore, an effective adjustment of the surface properties even at high line speeds. In addition, for example, by providing pneumatic cylinders a particularly uniform and defined adjustable belt tension of the dual-belt press can be achieved, such that the adjustment of the surface quality as well as of the compression can be particularly accurate. Herein, the belt press can include steel belts and may be heated by a thermal oil heater.

Smoothing or adjusting the surface quality in this step can mean that while the top surface is smoothed, already introduced structures or pores are however not affected or are affected only in a specified area, such that they still are present in a desired manner even after this process step. This can be enabled in particular by use of a belt press with a suitable temperature profile and with suitable pressure values. Thus, the double belt press can serve as a calibration zone in particular for setting the final surface properties as well as the thickness of the carrier.

In the further course subsequently a further process step f) for cooling the web-like carrier is carried out. The carrier may be cooled to a temperature corresponding to room temperature or solely as an example lies in a range of up to 20° C. or more by providing a cooling device with defined cooling stages. For example, a plurality of cooling zones can be provided in order to enable a defined cooling of the carrier.

After the cooling of the produced carrier the carrier may be stored temporarily in web-like form or as separate plate-shaped carriers and the process can be finished for the moment. Preferably, however, further processing steps follow, which can be realized without sanding, in particular in order to process the carrier such that a finished panel is obtained, as will be explained in detail below.

For producing a finished panel the method comprises the further process steps in order to provide the carrier with a decor and coat it with a protective layer. Here, the following steps are preferably carried out immediately with the produced web-like carrier. The invention, however, also includes that the web-like carrier is first divided into a plurality of plate-shaped carriers prior to any one of the process steps g) to j) and/or the plate-shaped carrier is further processed by the corresponding following process steps. The following explanations apply for both alternatives, wherein in the following for simplification we consider a processing of the carrier.

Thus, for example, according to the process step k) prior to process step g) optionally a pretreatment of the carrier for inducing an electrostatic discharge can take place. This can in particular serve to prevent the occurrence of blurring in the course of the decor application. This is in particular suitable for printing processes for applying the decorative layers, because electrostatic charge which builds up in the carriers to be printed in the course of the production process results in a deflection of paint or ink droplets on their way from the print head to the surface to be printed. The thus induced inaccuracy of the paint or ink application leads to a perceivable blurring of the printed image.

Herein the means for discharging electrostatic charges may at least be a roller, a brush or a lip of a conductive material having a conductivity $\geq 1 \cdot 10^3$ Sm$^{-1}$, which electrically conductive contacts the carrier at least in the region of the printing mechanism and which is connected to an electrical ground potential. In this case, the electrical ground potential may be provided, for example, by a grounding. In addition, for example, a means for discharging electrostatic charges may be a corona discharge means.

According to process step g) further optionally a decor subsurface may be applied onto at least a portion of the carrier. For example, first a primer particularly suited for printing processes can be applied as a decor subsurface, for example in a thickness of ≥10 μm to ≤60 μm. Herein, as a primer a liquid radiation curable mixture based on a urethane or urethane acrylate, optionally with one or more of a photoinitiator, a reactive diluent, a UV stabilizer, a rheological agent such as a thickener, radical scavengers, leveling agents, antifoams or preservatives, pigment, and/or a dye can be used. For example, the urethane acrylate may be included in the primer composition in the form of reactive oligomers or prepolymers. The term "reactive oligomer" and "prepolymer" in the sense of the invention is a compound comprising a urethane acrylate unit which is able to react radiation-induced, optionally with addition of a reactive binder or a reactive diluent, into urethane polymer or urethane acrylate polymer. Herein, urethane acrylates in the sense of the invention are compounds which in particular are composed of one or more aliphatic structural elements and urethane groups. Aliphatic structural elements comprise both alkylene groups, preferably comprising 4 to 10 carbon (C) atoms and cycloalkylene groups preferably comprising 6 to 20 carbon atoms. Both the alkylene and the cycloalkylene groups may be mono- or polysubstituted with $C_1$-$C_4$ alkyl, in particular methyl and include one or more non-adjacent oxygen atoms. The aliphatic structural elements are optionally linked to each other via quaternary or tertiary carbon atoms, via urea groups, biuret, uretdione, allophanate, cyanurate, urethane, ester or amide groups or via ether oxygen or amine nitrogen. Furthermore, urethane acrylates in the sense of the invention can also include ethylenically unsaturated structural elements. These preferably include vinyl or allyl groups, which may be substituted with $C_1$-$C_4$ alkyl, in particular methyl and which, in particular, are derived from, of α,β-ethylenically unsaturated carboxylic acids and their amides. Particularly preferred ethylenically unsaturated structural units are acryloyl and methacryloyl groups such as acrylamido and methacrylamido and in particular acryloxy and methacryloxy. Radiation-curable in the sense of the invention means that the primer composition induced by electromagnetic radiation of a suitable wavelength, such as ultraviolet radiation or electron beams, can be at least partially polymerized.

The use of radiation-curable primers based on urethane acrylates allows in a particularly advantageous manner an application of the decor immediately subsequent to the application and the radiation-induced curing of the primer layer, for example, by means of a digital printing technique. Herein, the primer layer provides for a good adhesion of the applied decor onto the carrier surface coated with the primer. Herein, urethane acrylates offer the advantage of good adhesion to both the carrier material and the decorative layer, i.e. the decor paint or ink. This inter alia resides in the polymerization reactions occurring in this type of polymers, in which on the one hand a radiation-induced radical polymerization of the OH groups occurs and on the other hand post curing of the polymer via the NCO groups occurs. Thus, after the radiation-induced curing immediately a tack-free and further processable surface is obtained, while the final properties of the primer layer are also influenced by the post-curing process based on the NCO groups and provide for a secure bond to the carrier material. In addition, the occurring post-curing process ensures that a sufficient layer stability is achieved even in less or non-exposed areas of the carrier. Thus the method according to the invention enables in particular also pre-textured carriers, i.e. carriers whose surface already has a three-dimensional structure, to be provided with a primer layer, thereby ensuring that the subsequently applied decor firmly adheres to the carrier.

In the method according to the invention the primer can be preferably applied onto the carrier plate by means of rubber rollers, a pouring device, or by spraying. Preferably, the primer is applied in an amount between ≥1 $g/m^2$ and ≤100 $g/m^2$, preferably between ≥10 $g/m^2$ and ≤50 $g/m^2$, in particular between ≥20 $g/m^2$ and ≤40 $g/m^2$. Subsequently to the application of the primer onto the carrier surface an irradiation process by means of a radiation source of an appropriate wavelength is carried out.

In addition to the use of a primer it is possible to apply the decor onto a decorative paper printable with the corresponding decor, which may be provided by means of a resin layer as a bonding agent previously applied onto the carrier. Such a printing subsurface is suitable for flexographic printing, offset printing or screen printing as well as in particular for digital printing techniques such as inkjet processes or laser printing. For the application of the resin layer it may be preferably provided that a resin composition is applied, which as a resin component at least comprises one compound selected from the group consisting of melamine resin, formaldehyde resin, urea resin, phenol resin, epoxy resin, unsaturated polyester resin, diallyl phthalate or mixtures thereof. Herein, the resin composition can, for example, be applied in an area density between ≥5 $g/m^2$ and ≤40 $g/m^2$, preferably ≥10 $g/m^2$ and ≤30 $g/m^2$. Further, a paper or a non-woven fabric with a grammage between ≥30 $g/m^2$ and ≤80 $g/m^2$, preferably between ≥40 $g/m^2$ and ≤70 $g/m^2$, can be applied onto the plate-shaped carrier.

Furthermore, according to process step h) a decor simulating a decoration template can be applied on at least a portion of the carrier. In this case, the decor may be applied by so-called direct printing. The term "direct printing" in the sense of the invention means the application of a decor directly onto the carrier of a panel or onto an unprinted fiber material layer or a decor subsurface applied to the carrier. Different printing techniques such as flexographic printing, offset printing or screen printing may be used. In particular, for example, inkjet processes or laser printing can be used as digital printing techniques.

For example, in order to imitate or replicate a decorative template in a particularly detailed and highly accurate manner in a three-dimensional form, the decor can be applied identically to the template. In particular, the three-dimensional decor data can be provided by three-dimensionally scanning the decor template by means of electromagnetic radiation such as by a three-dimensional scanner (3D scanner). Herein, a plurality of decor layers with at least partially different surface application amounts can successively be applied on the basis of provided three-dimensional decor data.

Moreover, the decorative layers may be formed of a particularly radiation curable paint and/or ink. For example, a UV-curable paint or ink can be used. In this embodiment a particular detailed and matching replica of the decorative template can be obtained. On the one side a highly accurate synchronous pore can be achieved in this way without providing further measures. Herein, a synchronous pore can in particular be a pore or another structure, which spatially is located exactly there where it is displayed visually by a haptic texture matching with the optical decor features. In this embodiment this is essentially automatically the case, because the structural design is created by the paint or ink. In addition, decorative templates, such as wood-based materials, often comprise a variation of the color impression not only along their width or length but also along their depth. Even this color impression or color gradient can be simulated particularly detailed in this embodiment, such that the overall appearance of the panel looks even more identical. Herein, a particularly rapid solidification can be achieved especially when the paint or ink used is radiation curable, whereby the plurality of layers may be applied rapidly in succession, such that the entire process can be realized within a reduced time and thus is particularly cost-efficient.

The term radiation curable paint in the sense of the invention means a binder and/or filler as well as color pigments containing composition which induced by electromagnetic radiation of a suitable wavelength, such as UV radiation or electron beams, can be at least partially polymerized.

The term radiation curable ink in the sense of the invention means a composition essentially free of fillers and comprising color pigments, which induced by electromagnetic radiation of a suitable wavelength, such as UV radiation or electron beams, can be at least partially polymerized.

Herein, the decorative layers each can be applied in a thickness in the range of ≥5 μm to ≤10 μm.

In addition to a positive image with respect to the color and/or texture it can also be provided to apply a corresponding negative image of the decorative template. In detail, as is known, for example, from positive staining or negative staining of wood-based materials, by the use of digital data the color impression of a texture can be inverted, so that with respect to the color and in particular with respect to lighter and darker areas a negative is created. A similar effect, in addition to the color impression, is possible for the applied structure, too, such that also with respect to the structural design a negative can be realized. Such effects, too, can be integrated into a manufacturing process based on digital three-dimensional data without any problems and without lead-time or retrofitting.

According to process step i) a protective layer can be applied on at least a portion of the decor. Such a layer for protecting the applied decor can in particular be applied in a subsequent process step as a wearing or top layer on top of the decorative layer, and in particular protects the decorative layer against wear or damage caused by dirt, moisture or mechanical impacts, such as abrasion. For example, it may be provided that the wearing and/or top layer is laid onto the printed carrier as a prefabricated overlay layer, such as based on melamine, and is bonded thereto by means of pressure and/or heat. Moreover, it may be preferred that for the formation of the wearing and/or top layer, too, a radiation curable composition, for example a radiation curable varnish such as an acrylic varnish, is applied. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof, in order to increase the wear resistance of the layer. Herein, the coating can be applied, for example, by means of rollers, rubber rollers or by means of pouring devices.

Furthermore, the top layer can initially be partially cured and subsequently a final coating with an urethane acrylate and a final curing step e.g. by use of a gallium emitter can be conducted.

Moreover, the top and/or wearing layer can comprise means for reducing the static (electrostatic) charging of the finished laminate. For example, it may be provided that the top and/or wearing layer comprises compounds such as choline chloride. Herein, the antistatic agent may, for example, be included in the composition for forming the top and/or wearing layer at a concentration between ≥0.1 wt.-% and ≤40.0 wt.-%, preferably between ≥1.0 wt.-% and ≤30.0 wt.-%.

Moreover, it can be provided according to process step j) that in the protective layer or in the wearing or top layer a texture, in particular a surface texture matching with the decor is produced by introducing pores. Herein, it may be provided that the carrier plate already has a texture and an alignment of a printing tool for applying the decor with respect to the carrier plate is implemented depending on the texture of the carrier plate which is detected by means of optical methods. Herein, for aligning the printing tool and the carrier plate relative to each other it can be provided that a relative movement between the printing tool and the carrier plate necessary for the alignment is implemented by shifting the carrier plate or by shifting the printing tool. Moreover, it can be provided that a texturing of the decorative panel is implemented subsequently to the application of the top and/or wearing layer. To this end it may be preferred to apply a settable composition as the top and/or wearing layer and a curing process is done solely to the extent that only a partial curing of the top and/or wearing layer is achieved. In the thus partially cured layer by means of appropriate tools, such as a hard metal texture roller or a die, a desired surface texture is embossed. Herein, the embossing process is implemented in correspondence with the applied decor. In order to ensure a sufficient correspondence of the texture to be produced with the decor it may be provided that the carrier plate and the embossing tool are aligned relative to each other by corresponding relative movements. Subsequently to the production of the desired texture within the partially cured top and/or wearing layer a further curing step is implemented with respect to the now textured top and/or wearing layer.

In many cases it is provided that a surface texture matching with the decor is introduced within such a wearing and/or top layer. A surface texture matching with the decor means that the surface of the decorative panel has a haptically perceptual structure, which according to its shape and pattern corresponds to the applied decor in order to achieve a reproduction of a natural material as close to the original as possible even with respect to the haptic.

In addition, on the side opposite to the decor side a counteracting means may be applied. Herein, it is particularly preferred that the counteracting means is applied in a common calendering step with the paper or non-woven fabric on the decor side.

Alternatively or additionally the edge regions of the panel can be textured or profiled particularly in order to provide in particular releasable connecting elements. In this regard, with a profiling in the sense of the invention it may be provided that by means of suitable cutting tools at least in a part of the edges of the decorative panel a decorative and/or functional profile is produced. Herein, a functional profile means, for example, the production of a groove and/or tongue profile within an edge in order to allow decorative panels to be connected to each other by means of the produced profiles. In particular with groove and/or tongue profiles elastic materials are advantageous because they allow to produce those kind of profiles, which are particularly easy to handle and are stable. Thus, in particular no additional materials are required to produce the connecting elements.

The method described above enables an improved production of a wall panel or floor panel.

In particular, the carrier material can be chosen arbitrarily and carrier materials can be used, which have particularly advantageous properties for the panel to be produced. For example, particular high quality panels can be produced, which can satisfy highest requirements with respect to appearance and stability. At the same time the production can be particularly effective and cost-efficient.

The method for producing carrier applicable in the method for producing a wall and floor panel may be advantageous in particular in the context of the present method according to the invention for producing a wall and floor panels, since it allows for very high line speeds well in excess of the line speeds known from the prior art as a feed speed of the carrier or the conveyor means for the production of a panel. Herein, in particular by use of a dual-belt press line speeds of up to 15 m/min can be achieved, wherein values of 6 m/min or more are possible even for materials which are problematic in this regard.

Moreover, by means of the above-described two-stage compression process in particular for panel carrier materials a very precise thickness can be achieved with thickness tolerances within a range of e.g. 0.1 mm or less. Thus, a carrier produced by the above-described method in addition to a particularly homogeneous composition further can comprise a particularly uniform thickness, so that a particularly defined and reproducible product and thus a particularly high quality can be obtained.

Furthermore, it has been found that in particular by the above-described method very stable carriers can be produced, which can be further improved with respect to the stability.

According to one embodiment a carrier based on a plastic or a wood plastic composite material (WPC) can be provided. For example, the carrier plate can be formed from a thermoplastic, elastomeric or duroplastic plastic material. In addition, recycling materials from said materials can be used in the context of the method according to the invention. Herein, preferred plate materials may be in particular thermoplastic plastic materials, such as polyvinyl chloride, polyolefins (for example polyethylene (PE), polypropylene (PP), polyamide (PA)), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or copolymers thereof. Herein, irrespective of the base material of the carrier, for example, plasticizers may be provided which may be present in a range of >0 wt.-% to ≤20 wt.-%, in particular ≤10 wt.-%, preferably ≤7 wt.-%, for example in a range of ≥5 wt.-% to ≤10 wt.-%. A suitable plasticizer, for example, is a plasticizer available under the trade name "Dinsch" from the BASF company. Moreover, as a substitute for conventional plasticizers copolymers such as acrylates or methacrylates can be used.

In particular thermoplastic plastic material offer the advantage that the products made from them can easily be recycled. It is also possible to use recycling materials from other sources. This enables a further reduction of the manufacturing costs.

Such carriers are very elastic or springy, which allows a comfortable feeling when walking on them and also a suppression of noises occurring during walking on them compared to conventional materials, thus, an improved impact sound can be realized.

In addition, the abovementioned carriers offer the advantage of a good water resistance, because they have a degree of swelling of 1% or less. This in a surprising way besides pure plastic carriers also applies to WPC materials, as will be explained in detail below.

In a particularly advantageous manner the carrier material can comprise or consist of wood polymer materials (Wood Plastic Composite, WPC). Here, as an example wood and a polymer may be suitable, which can be present in a ratio of 40/60 to 70/30, such as 50/50. As polymeric components polypropylene, polyethylene or a copolymer of the two abovementioned materials can be used. Such materials offer the advantage that they can be formed into a carrier in the above-described process already at low temperatures, such as in a range of ≥180° C. to ≤200° C., so that a particularly effective process control, such as with exemplary line speeds in a range of 6 m/min, is possible. For example, a WPC product with a 50/50 proportion of wood and polymer components with an exemplary product thickness of 4.1 mm is possible, which may allow for a particularly effective manufacturing process.

In addition, in this way very stable panels can be produced, which moreover have a high elasticity, which in particular can be advantageous for an effective and cost-efficient configuration of connecting elements at the edge region of the carrier and further with respect to an impact sound insulation. Furthermore, the abovementioned good water tolerance with a degree of swelling of less than 1% can be achieved in such WPC materials. Herein, WPC materials can comprise, for example, stabilizers and/or other additives which preferably may be present in the plastic portion.

Furthermore, it may be particularly advantageous that the carrier material comprises or consists of a PVC-based material. Even such materials can be used in a particularly advantageous manner for high quality panels that can easily be used even in wet rooms. Furthermore, also PVC-based carrier materials may be useful for a particularly effective manufacturing process, since here line speeds of 8 m/min for an exemplary product thickness of 4.1 mm may be possible, which could allow for a particularly effective manufacturing process. Moreover, also such carriers have an advantageous elasticity and water tolerance, which can lead to the abovementioned advantages.

Herein, in plastic-based panels as well as in WPC-based panels mineral fillers may be advantageous. Particularly suitable are talc or calcium carbonate (chalk), aluminum oxide, silicagel, quartz powder, wood flour, gypsum. For example, chalk may be provided in a range of ≥30 wt.-% to ≤70 wt.-%, wherein the fillers, in particular chalk can improve the slip of the carrier. They also can be colored in a known manner. In particular, it can be provided that the plate material comprises a flame retardant.

According to a particularly preferred embodiment of the invention the carrier material consists of a mixture of a PE/PP block copolymer with wood. Herein, the proportion of the PE/PP block copolymer and the proportion of wood can range between ≥45 wt.-% and ≤55 wt.-%. Furthermore, the carrier material can comprise between ≥0 wt.-% and ≤10 wt.-% of other additives such as flow agents, heat stabilizers or UV stabilizers. Here, the particle size of the wood is between >0 µm and ≤600 µm with a preferred particle size distribution of $D_{50} \geq 400$ µm. In particular, the carrier material may comprise wood with a particle size distribution of $D_{10} \geq 400$ µm. The particle size distribution is based on the volumetric diameter and refers to the volume of the particles. Particularly preferably the carrier material is provided as granular or pelletized pre-extruded mixture of a PE/PP block copolymer with wood particles with the specified particle size distribution. Here, the granules and/or pellets can preferably have a particle size in the range of ≥400 µm to ≤10 mm, preferably ≥600 µm to ≤10 mm, in particular ≥800 µm to ≤10 mm.

According to a further preferred embodiment of the invention the carrier material consists of a mixture of a PE/PP polymer blend with wood. Here, the proportion of PE/PP polymer blend as well as the proportion of wood can range between ≥45 wt.-% and ≤55 wt.-%. Furthermore, the carrier material can comprise between ≥0 wt.-% and 10 wt.-% of other additives such as flow agents, heat stabilizers or UV stabilizers. Here, the particle size of the wood is between >0 μm and ≤600 μm with a preferred particle size distribution of $D_{50} \geq 400$ μm. In particular, the carrier material may comprise wood with a particle size distribution of $D_{10} \geq 400$ μm. The particle size distribution is based on the volumetric diameter and refers to the volume of the particles. Particularly preferably, the carrier material is provided as a granular or pelletized pre-extruded mixture of a PE/PP polymer blend with wood particles with the specified particle size distribution. Here, the granules and/or pellets can preferably have a particle size in the range of ≥400 μm to ≤10 mm, preferably ≥600 μm to ≤10 mm, in particular ≥800 μm to ≤10 mm.

In a further embodiment of the invention, the carrier material consists of a mixture of a PP-homopolymer with wood. The proportion of the PP homopolymer and the proportion of wood can range between ≥45 wt.-% and ≤55 wt.-%. Furthermore, the carrier material can comprise between ≥0 wt.-% and ≤10 wt.-% of other additives, such as flow agents, heat stabilizers or UV stabilizers. Here, the particle size of the wood is between >0 μm and ≤600 μm with a preferred particle size distribution of $D_{50} \geq 400$ μm. In particular, the carrier material can comprise wood with a particle size distribution of $D_{10} \geq 400$ μm. The particle size distribution is based on the volumetric diameter and refers to the volume of the particles. Particularly preferably the carrier material is provided as a granular or pelletized pre-extruded mixture of a PP homopolymer with wood particles of the specified particle size distribution. The granules and/or pellets can preferably have a particle size in the range of ≥400 μm to ≤10 mm, preferably ≥600 μm to ≤10 mm, in particular ≥800 μm to ≤10 mm.

In another embodiment of the invention, the carrier material consists of a mixture of a PVC polymer with chalk. Herein, the proportion of the PVC polymer and the proportion of chalk can range between ≥45 wt.-% and ≤55 wt.-%. Furthermore, the carrier material can comprise between ≥0 wt.-% and ≤10 wt.-% of other additives, such as flow agents, heat stabilizers or UV stabilizers. The particle size of the chalk is between >0 μm and ≤600 μm with a preferred particle size distribution of $D_{50} \geq 400$ μm. In particular, the carrier material may comprise chalk with a particle size distribution of $D_{10} \geq 400$ μm. The particle size distribution is based on the volumetric diameter and refers to the volume of the particles. Particularly preferably the carrier material is provided as a granular or pelletized pre-extruded mixture of a PVC polymer with chalk with the specified particle size distribution. The granules and/or pellets can preferably have a particle size in the range of ≥400 μm to ≤10 mm, preferably ≥600 μm to ≤10 mm, in particular ≥800 μm to ≤10 mm.

In a further embodiment of the invention the carrier material consists of a mixture of PVC polymer with wood. Herein, the proportion of the PVC polymer and the proportion of the wood can range between ≥45 wt.-% and ≤55 wt.-%. Furthermore, the carrier material can comprise between ≥0 wt.-% and ≤0 wt.-% of other additives, such as flow agents, heat stabilizers or UV stabilizers. The particle size of the wood is between >0 μm and ≤600 μm with a preferred particle size distribution of $D_{50} \geq 400$ μm. In particular, the carrier material can comprise wood with a particle size distribution of $D_{10} \geq 400$ μm. The particle size distribution is based on the volumetric diameter and refers to the volume of the particles. Particularly preferably the carrier material is provided as granular or pelletized pre-extruded mixture of a PVC polymer with wood particles of the specified particle size distribution. The granules and/or pellets can preferably have a particle size in the range of ≥400 μm to ≤10 mm, preferably ≥600 μm to ≤10 mm, in particular ≥800 μm to ≤10 mm.

For determining the particle size distribution well-known methods such as laser diffractometry can be used, by means of which particle sizes in the range from a few nanometers up to several millimeters can be determined. Using this method also $D_{50}$ or $D_{10}$ values can be determined, according to which 50% and 10%, respectively, of the measured particles are smaller than the specified value.

According to a further embodiment, the pourable carrier material has a full width half maximum of the particle size in the range of ≥1.8 mm, in particular ≥2 mm, for example ≥2.3 mm, in particular ≥2.5 mm, wherein the upper limit in principle can be freely chosen, for example ≤6 mm, such as ≤4.5 mm, for example ≤3 mm. For determining the particle sizes well-known methods such as laser diffractometry can be used by means of which particle sizes in the range from a few nanometers up to several millimeters can be determined. Full width half maximum, which is also known as FWHM (Full Width at Half Maximum) conventionally means in particular the difference between the two argument values for which the function values have decreased to half of the maximum, i.e. in the corresponding graph the "width at half height".

Surprisingly it has been found that a carrier material with such a relative inhomogeneous particle size distribution can result in that melting of the carrier is significantly improved or homogenized. In detail, a complete melting of the carrier material can be accelerated by the use of a carrier material of this embodiment, such that the process can be made more economical. Moreover, it has surprisingly been found that in using a pourable carrier material in this embodiment according to the above-described treatment or production carriers can be provided which may comprise a particularly smooth and thus high-quality surface. For example, a ripple of the surface with a wave depth in a range of 20-40 μm can be achieved.

Herein, the particle size distribution in this embodiment is in contrast to requirements often specified in the prior art, according to which no inhomogeneity of the particle sizes is allowed and it is rather desirable to use highly homogeneous pourable raw materials.

For example, such carrier materials can be provided by grinding or shredding raw material, which can be realized, for example, in a granulator. For example, a granulator with a screen of 6 mm can be used to provide a carrier material of this embodiment.

Herein, in particular carrier materials can be provided which have a particularly suitable fine grain content. For example, the proportion of fine grains can be in the range of >0 wt.-% to ≥50 wt.-%, for example ≥5 wt.-% to <40 wt.-%, such as in the range of ≥10 wt.-% to <30 wt.-%, determined by use of a screen with a mesh size of 2 mm. In other words, the carrier materials may have particles with a size in a range of <2 mm in one of the abovementioned ranges. Furthermore, besides a fine grain portion relative large particles can be provided in the carrier material. Such, it may be provided, for example, that a portion with a particle size in the range of ≥3 mm, for example, of ≥4 mm, is present in the carrier material in an amount of ≥30 wt.-%, for example ≥40 wt.-%. Thus, from the foregoing it is apparent that the full width half maximum of the particle size is relatively high due to a comparatively high inhomogeneity of the particle sizes.

Herein, as raw material for such a shredding process, for example, recycled materials can be used, as already indicated above. For example, wastrel of produced carrier plates can be supplied as raw material to a prescribed shredding process and then be used as carrier material. In particular, by use of rejects of produced carrier plates the manufacturing process can be particularly economical. A further advantage is that such recycled material is already adapted to or satisfies the respective requirements, such as with respect to the composition. Herein, it can be provided that the crushed material of the rejects admixed with the conventional carrier material in a certain proportion or is used exclusively.

Furthermore, for example, a carrier material can be used which has a particularly suitable melt flow index (Melt Flow Index MFI). The MFI value may, for example, be determined according to DIN 53 735 or ISO 1133. Particularly suitable values can be in the range of $\geq 7.0$ g/10 min to 9.0 g/10 min. Here, the above values are determined in accordance with the abovementioned standard, wherein as concrete measurement conditions 10 kg/190° C., wherein a MFI value of $\geq 8.0$ g/10 min to $\leq 9.0$ g/10 min, for example, 8.5 g/10 min may be advantageous, and 21.6 kg/190° C., respectively, were used, wherein a MFI value of $\geq 7.5$ g/10 min to $\leq 8.5$ g/10 min, for example, 7.9 g/10 min may be advantageous, wherein the abovementioned values are not to be understood as limiting.

According to another embodiment the carrier material may comprise hollow microspheres. This kind of additives can in particular cause that the density of the carrier and thus of the produced panel can be significantly reduced, such that a particularly simple and cost-effective transportation and also a very comfortable laying can be guaranteed. Herein, in particular by the insertion of hollow microspheres, a stability of the produced panel can be ensured which is not significantly reduced compared to a material without hollow microspheres. Thus, the stability is sufficient for most applications. Herein, hollow microspheres can be understood in particular as structures, which have a hollow basis body and a size or a maximum diameter in the micrometer range. For example, usable hollow spheres may have a diameter in the range of $\geq 5$ µm to $\leq 100$ µm, such as $\geq 20$ µm to $\leq 50$ µm. As a material of the hollow microspheres basically any material comes into consideration, such as glass or ceramic. Further, due to the weight plastics, such as the plastics used in the carrier material, such as PVC, PE or PP can be advantageous, wherein these optionally can be prevented from deforming during the manufacturing process by suitable additives.

According to a further embodiment the belt-like conveyor means may be at least partially textured. By the use of textured conveyor means a carrier can be produced which is also textured and thus, for example, may comprise pores, which, for example, can reflect a natural product to be simulated. In this way any further texturing in the subsequent production process of the panel can be dispensed with, which can make the subsequent processing steps particularly simple, quick and cost-efficient. In addition, the texture or the pores in this embodiment can be realized in one step together with the molding of the web-like carrier, such that a further processing step for forming the pores can be dispensed with. Furthermore, the formed texture, because it is already present in the carrier and thus in the core of the panel, can be particularly stable and durable even at extreme stresses. In addition to the production of a texture, the conveyor belts can also have a defined roughness, since in this way venting during the molding of the carrier can be improved. Herein, for example, different surface roughnesses may be used for the upper and the lower belt, wherein the lower belt can have a greater roughness depth than the upper belt or belt-like conveyor means. For example, the lower belt and/or the upper belt can have a roughness depth in the range from $\geq 0$ to $\leq 25$ µm.

According to a further embodiment a sensor for verifying the placement of the carrier material between the two belt-like conveyor means can be provided. In particular, the sensor can detect the placement of the carrier material on the lower conveyor means. For example, a sensor in particular based on X-rays may be provided that verifies the basis weight of the coated material and thus the homogeneity of the deposited material. Preferably, the sensor may include a feedback to the spreading units in order to be able to respond directly to a faulty deposition. Herein, the sensor can be shielded by respective protective plates in order to prevent unwanted leakage of X-rays. Moreover, a cooling system can be provided for protecting and increasing the lifetime of the sensor.

According to a further embodiment a fiber material may be incorporated into the carrier. In particular, the fiber material can be incorporated into the carrier in process step b). In this embodiment therefore a fiber material, in particular a fiber material web can be wound onto a coil and unwound by an unwinding station for unwinding the fiber material and supplied between the two belt-like conveyor means in order to insert the fiber material. For example, in this embodiment a glass fiber mat can be used. In this embodiment a carrier with a particularly high strength or stability can be produced since the strength of the carrier can be increased significantly by means of the incorporated fiber material. Moreover, in this embodiment the carrier can be particularly tailored, because, for example, by providing a plurality of spreading units, as explained above in detail, the carrier material, for example, can be adjusted above and below the mat or non-woven fabric as desired. Moreover, a solution which enables an even better tailoring, can be realized by providing a plurality of fiber material webs, wherein the carrier material again may be varied or adjusted as desired.

According to a further embodiment a temperature gradient can be set in process step c). In particular, a temperature gradient can be set along a conveying direction of the carrier material. In this embodiment this process step enables a particularly high quality product and moreover a particularly high line speed. In detail, by using a temperature gradient along a conveying direction, for example, a particular rapid heating-up can be realized, which allows for a high line speed. This, for example, can be realized by a relative higher temperature in a first or leading region in the direction of conveyance. Herein, moreover, a high temperature impact onto the carrier material can be prevented, which prevents damages and enables a particularly high quality. Moreover, a degassing during heating of the carrier material can be improved and accelerated, which in turn allows for a high line speed and also a particularly high stability and quality through the prevention of gas inclusions. This can in particular be facilitated by a temperature gradient in a direction perpendicular to the conveying direction. In the latter case, the region below the carrier material can in particular be heated to a higher temperature than the region above the carrier material. Here, for example, a temperature gradient in the range of 50° C. may be advantageous.

According to a further embodiment process step c) may be carried out by use of two plate-shaped molding means. In this embodiment a particularly long processing time and molding of the carrier can be implemented even at high line speeds, which allows for a particularly defined molding of the carrier. In particular in this embodiment by means of a long contact time of the carrier material with the plate-shaped molding means, which can be correspondingly heatable, the carrier material can be heated easily to a desired and required temperature even at high line speeds. In addition, this embodiment also allows for the formation of temperature profiles in a particularly easy and effective way.

According to a further embodiment process step d) may be performed by use of a S-roller. By using a S-roller as a compression unit a desired compression is possible in a defined way with simple and inexpensive means even at high line speeds. In order to be able to set the corresponding and depending on the desired result appropriate force the roller can be shiftable, for example, in the direction perpendicular to the passing carrier material. Herein, the S-roller may, for example, comprise only a single roller, which exerts a force only in combination with a counter-force generated by the belt tension of the conveyor means. Alternatively, one or a plurality of counter rollers may be provided, which apply the corresponding counter force. A S-roller in the sense of the invention is a roller, which is arranged such that the carrier passes it in a S-shaped path as is well known to those skilled in the art and is described in detail below with reference to the figures.

According to a further embodiment in process step e) the carrier can be compressed by a factor of >0% to 7%, preferably >0% to 5%. Thus, in this embodiment in process step e) by means of a slight compression a particularly smooth surface can be obtained, since this process step can be substantially matched to the smoothing or setting of the surface quality. Thus, the entire set-up of the press, in particular of the dual-belt press, can be optimized to smoothing and no focus has to be laid on an excessive compression, such that even at high throughputs a particularly good surface appearance can be obtained.

Regarding further technical features and advantages of the method it is hereby explicitly referred to the description of the device, the wall or floor panel as well as to the figures.

Moreover, the invention relates to an apparatus for producing a decorated wall or floor panel characterized in that the apparatus comprises means for performing a method configured as described above. With respect to the provision of corresponding means and their advantages it is explicitly referred to the description of the method, the wall or floor panel as well as to the figures.

Moreover, the invention relates to a wall or floor panel produced according to a method described above, wherein a plate-shaped carrier comprises a profile at least in an edge region. In profiling in the sense of the invention it is provided that by means of suitable cutting tools at least in a portion of the edges of the decorative panels a decorative and/or functional profile is produced. Herein, a functional profile, for example, means the formation of a groove and/or tongue profile at an edge in order to enable to connect decorative panels to each other by means of the formed profiles. A decorative profile in the sense of the invention, for example, is a chamfer formed at the edge region of the decorative panel, for example, in order to simulate a joint between two interconnected panels, such as for example in so-called wide planks.

By partially profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By means of the application of the decor subsequently to the at least partially profiling of the carrier, for example, by means of the above-described methods, such as direct printing, abrasion or damage of the decor in the course of the profiling process can be avoided in an advantageous way. Thus, the decor also in the regions of the profile corresponds in detail the desired imitation, for example, of a natural material.

In order to provide a particular detailed imitation even in the profiled regions the master used for the printing process can be distortion corrected in the region of the profile of the panel. Distortion correction in the sense of the invention means, for example, with respect to the exemplary case of application by means of a printing process, that the distortion of the printed image caused by the deviation of the profiling out of the surface plane of the carrier, for example, at a chamfer edge, is corrected by matching the master with the deviation. Herein, it may be provided, for example, that the correction of the distortion is implemented by matching the pixel spacing, the pixel size and/or the ink application depending on the intended edge profile of the finished decorative panel. Herein, in case of printing by means of digital printing the print head can be driven depending on the distortion to be corrected, such that the print head, for example, is deflected beyond the profiled region and the ink discharge is adapted to the profile.

Here, it is e.g. possible that prior to the application of the decorative layer of the carrier provided as a large plate, the joints (such as V-joints) to be provided in the final panel laminate, are milled into the carrier, on the thus profiled carrier at least the decorative layer is applied and subsequently the carrier is cut at least in the profiled areas. Herein, depending on the cutting method, such as sawing, laser or water jet cutting, it may be preferred that the required bleed allowance is taken into account in the produced profile.

For example, the plate-shaped carrier can comprise a material which is based on a WPC material or a PVC material. With respect to the exact composition and the advantages resulting therefrom we explicitly refer to the above description of the method.

Regarding further technical features and advantages of the wall or floor panel we hereby explicitly refer to the description of the method, the apparatus and to the figures.

The apparatus of FIG. 1 is suitable for a method for producing a decorated wall or floor panel. With respect to FIG. 1 in particular processing stations for the following process steps will be described:
  a) providing a pourable carrier material, in particular a granulate material,
  b) placing the carrier material between two belt-like conveyor means,
  c) molding the carrier material under the influence of temperature, and forming a web-like carrier.
  d) compressing the carrier,
  e) treating the carrier material web under the influence of temperature and pressure using a dual-belt press,
  f) cooling the carrier.

Subsequently to these process steps the method may comprise further process steps in order to obtain the finished wall or floor panel.

The apparatus 10 according to FIG. 1 comprises two revolving belt-like conveyor means 12, 14, which in particular are guided by guide rollers 16 such that a receiving space 18 is formed therebetween for receiving and processing a provided pourable, in particular granular carrier material 20, for example based on a plastic comprising e.g. PVC, or a wood plastic composite material comprising e.g. wood and PP, PE or a block copolymer comprising PP and PE. The conveyor means 12, 14 may at least partially be constructed of polytetrafluoroethylene, for example, be coated therewith. Furthermore, the conveyor means 12, 14 may at least partially, in particular at their side facing the receiving space 18, be roughened or textured. Furthermore, the conveyor means 12, 14 can have a width in a range of about 1.5 m.

Figure 3:
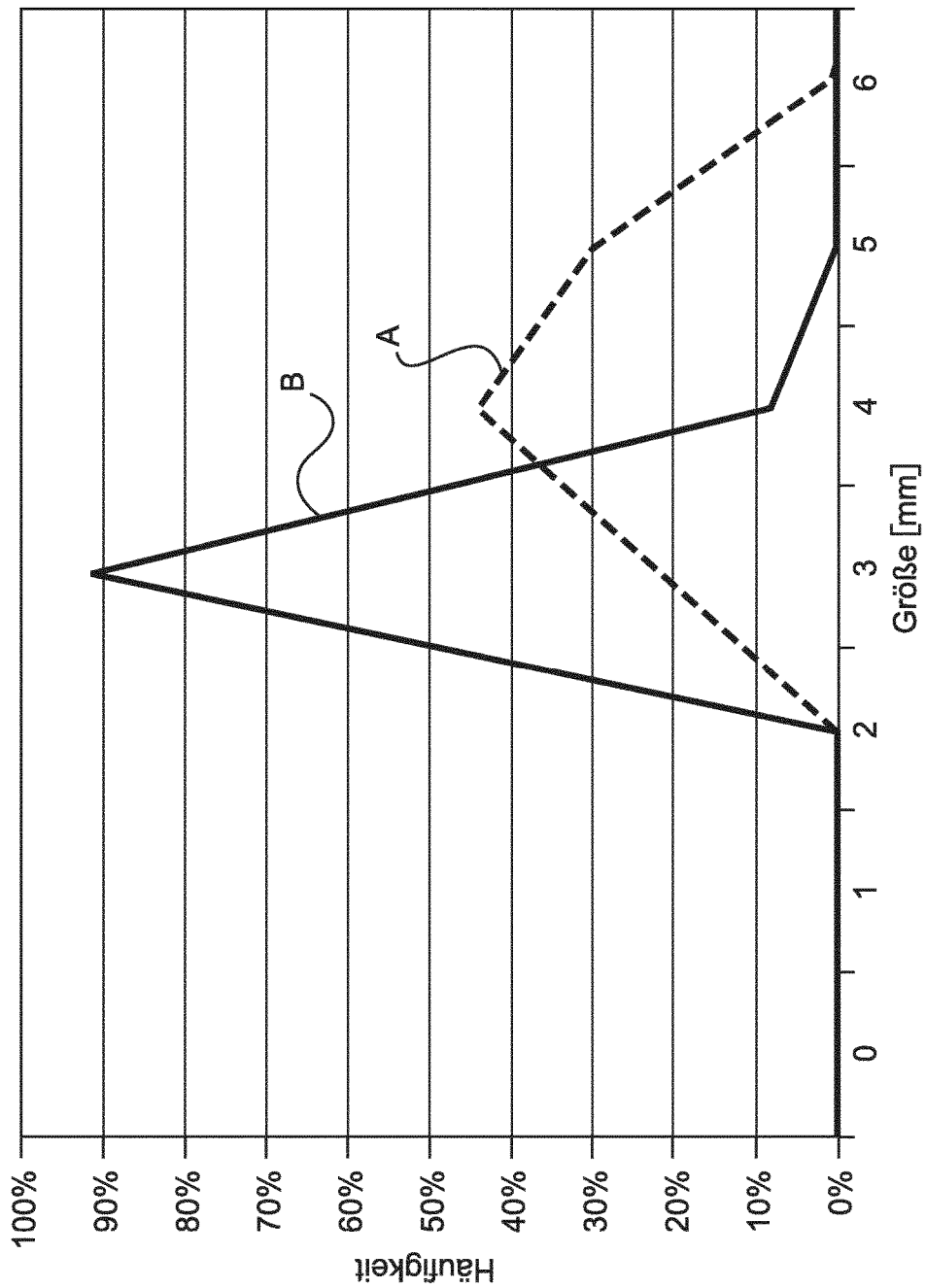
FIG. 3 shows a graph illustrating the full width half maximum of the particle sizes of a preferred pourable carrier material.
Figure 4:
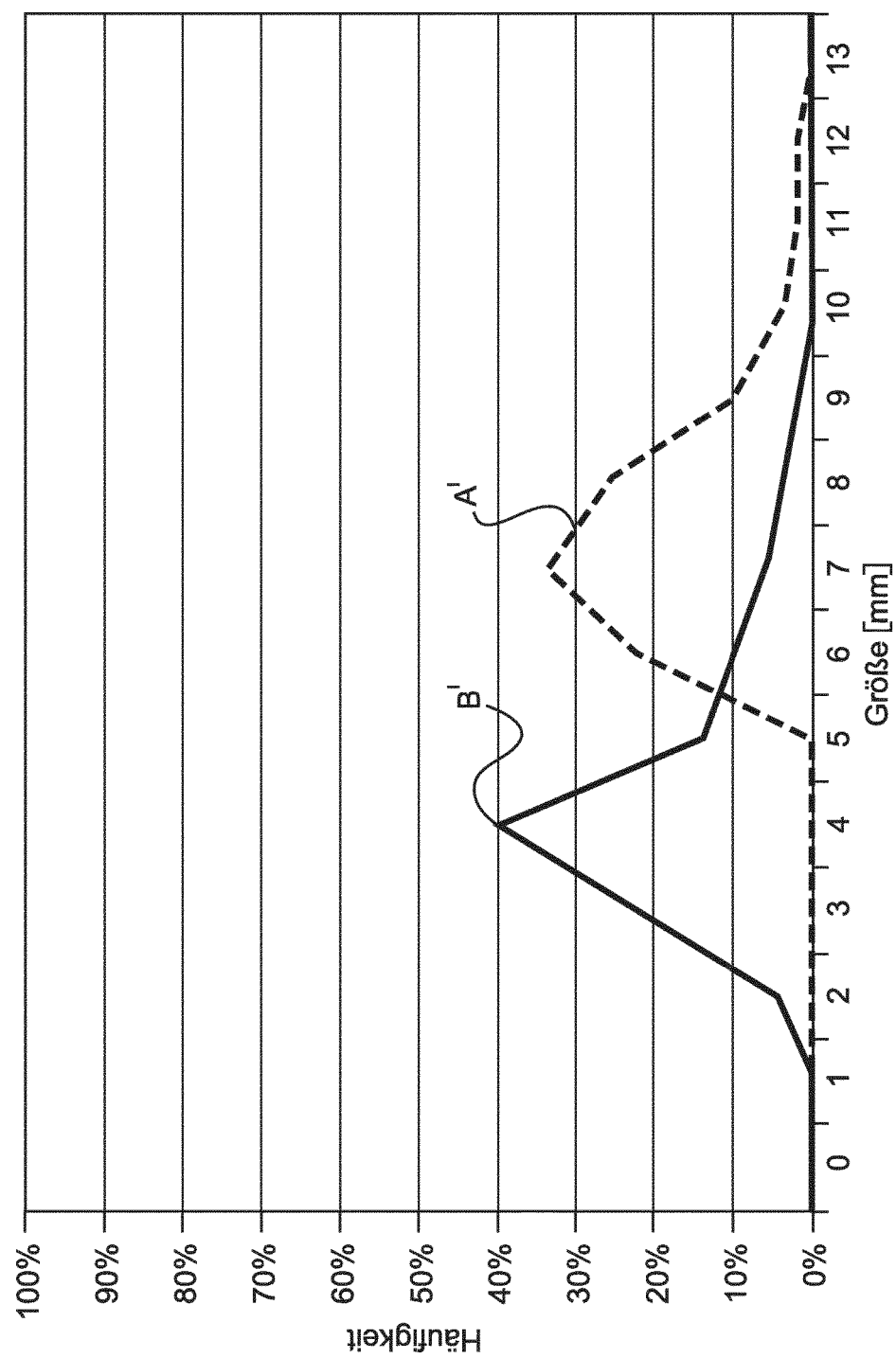
FIG. 4 shows a graph illustrating the full width half maximum of the particle sizes of a further preferred pourable carrier material.

With respect to the carrier 20 it may be particularly advantageous that it has a full width half maximum of the particle size in the range of ≥1.8 mm, for example ≥2 mm, in particular ≥2.3 mm, for example ≥2.5 mm, and thus a relative high inhomogeneity of the particle size. This is illustrated in FIGS. 3 and 4, in which curves A and A' each describe a particularly preferred carrier material 20 and curves B and B' each describe a carrier material 20 which is also basically suited according to the invention and has relative homogeneous particle size distribution. It can be seen that the carrier material 20 of the curves B and B' provided, for example, as an extruder granular material has a full width half maximum of about 1.2 (curve B) and 1.7 (curve B'), respectively, whereas the carrier material 20 of the curves A and A' produced, for example, by a granulator has a full width half maximum of about 2.3 (curve A) and 2.7 (curve A'), respectively.

In order to place the carrier material 20 between the belt-like conveyor means 12, 14 or to place it within the receiving space 18 a discharge unit 22 is provided comprising one or a plurality of discharge heads 24 by means of which the carrier material 20 can be placed on the lower conveyor means 14. Herein, the discharge heads 24 may comprise a hopper 25 which applies the carrier material 20 onto corresponding spreading rollers 26, whereupon the carrier 20 can be scattered onto the lower conveyor means 14.

In order to ensure a homogeneous application of the carrier material 20 onto the lower conveyor means 14, a sensor for verifying the placement of the carrier material 20 can be provided between two belt-like conveyor means 12, 14. The sensor can in particular be coupled to the discharge unit 22 in order to correct directly a potentially inaccurate filling of the receiving space 18.

In order to enable a particularly homogeneous distribution of the carrier material 20 moreover vibrators may be provided. These can, for example, act on the lower conveyor means 14 and, for example, be disposed beneath the lower conveyor means 14 so that the carrier material 20 is dispersed finely.

In order to prevent unwanted contamination and damage of subsequent processing stations further a sensor for detecting metals may be provided which is able to detect unintentionally inserted metals.

Furthermore, a device for supplying a fiber material into the receiving space 18 and thus into the carrier can be provided. For example, the fiber material can be configured web-like and can be unwound from a coil. In this case, the fiber material can be located, for example, between two discharge heads 24 in order to be able to apply different materials above and below the fiber material. Thus, the fiber material can be supplied, for example, in such a way that above and a below the fiber material a desired amount of carrier material 20 is provided.

In the conveying direction of the conveyor means 12, 14 which is indicated by the arrow 13, moreover a molding unit 28 is provided which is configured to mold the carrier material 20 under the influence of temperature or heat for melting the carrier material 20 while forming a web-like carrier 36. To this end, the molding unit 28, for example, can comprise two plate-like molding means 30, 32, which can be heatable by a heater 34, for example by means of a thermal oil. Thereby, the carrier material 20 can be heated until depending, for example, on the melting point of the carrier material 20 or a portion thereof, it reaches a temperature of exemplarily and depending on the material used, such as PVC or WPU material, 180° C. to 200° C. To this end, the molding unit 28 or the molding means 30, 32 can be heated, for example, to a temperature of up to 250° C. Herein, one or, if it is intended to set a temperature gradient, a plurality of independently adjustable heating sections may be provided. For example, the entire molding means 30, 32 which, for example, may have a length of several meters, or only a part thereof can be heatable.

Furthermore, the molding unit 28 can in particular have a parallel gap which can be formed by the plate-like molding means 30, 32. However, an inlet mouth can be provided at the inlet by providing a conical shape in order to allow an improved entry of the carrier material 20. Herein, the load acting on the carrier material 20 can be in a range from >0 kg/m$^2$ to ≤1 kg/m$^2$. Herein, in particular a uniform pressurization without providing a pressure profile or a pressure gradient can be provided.

FIG. 1 further shows that the lower molding means 32 is longer than the upper molding means 30 and further commences upstream of the upper one. Thus it can be assured that a processing takes place only when the carrier material 20 is already melted or at least partially melted or at least partially softened. This enables a particularly defined molding process to be implemented.

Figure 2:
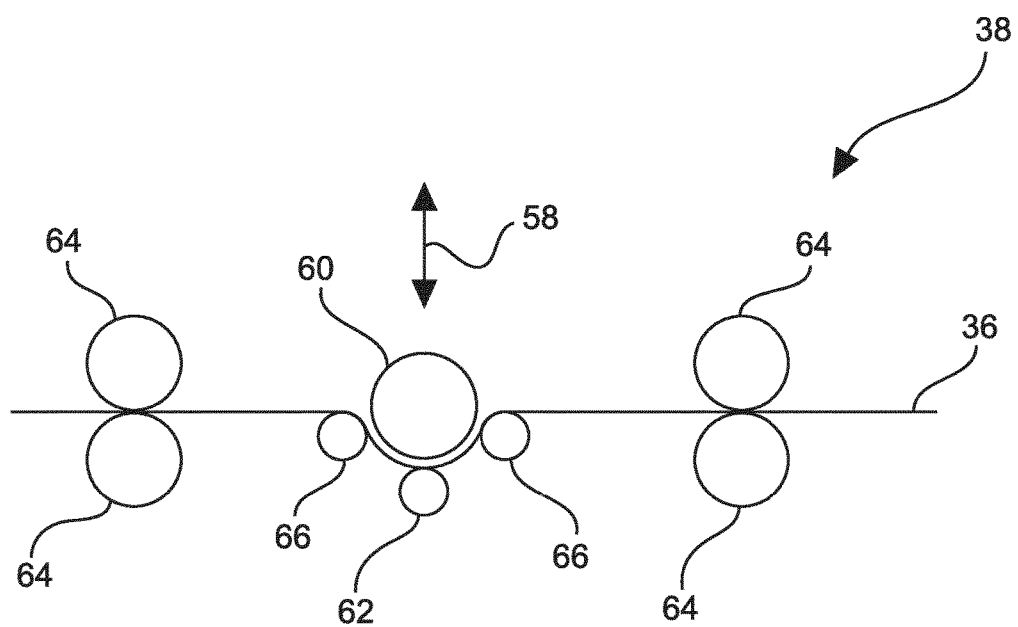
FIG. 2 shows an exemplary S-roller for carrying out a process step of the method according to the invention.

In the further course in the conveying direction of the conveyor units 12, 14 the web-like carrier 36 is guided through a pressing means 38. The pressing means 38 may for example comprise a S-roll, which is shown in detail in FIG. 2. Herein, the S-roll can be shiftable substantially perpendicular to the surface of the carrier 36 and thus to the moving direction of the carrier 36, as indicated by the arrow 58, so that desired pressures can particularly advantageously be adjusted. Furthermore, the pressing means 38 can, for example, exert a pressure onto the carrier 36 in the range of ≥1 kg/m$^2$ to ≤3 kg/m$^2$. Herein, the S-roller includes a main roller 60, which acts on the web-like carrier 36. Under certain circumstances, the belt tension may be sufficient as a counter pressure, however, it is preferred that at least one counter-pressure roller 62 is provided. For a suitable guiding of the web-like carrier 36 moreover two pairs of calender rollers 64 and, optionally, guide rollers 66 may be provided, which may also provide for a suitable belt tension. FIG. 2 shows that the web-like carrier 36 is guided around the guide rollers 66 and the main roller 60 in a dual S-shape, which kind of guide leads to the term S-roller. In detail, the main roller 60 may be wrapped by the web-like carrier 36 in a range of about 50% or more. The temperature of the carrier 36 at the entry into the pressing means 28 in particular corresponds to the temperature prevailing at the exit of the molding unit 28.

Then the carrier 36 is guided from the pressing means 38 to a further pressing means 40. In order to compensate for a possible heat loss of the carrier 36 or in order to further heat the carrier 36 intentionally a further heater 42, such as an IR heater, can be provided between the pressing means 38, 40.

Returning to the pressing means 40 it can advantageously be a dual-belt press, which may in particular comprise steel belts 44, 46, wherein the belts 44, 46 of the dual-belt press may be guided by guide rollers 48, 50. The guide rollers 48, 50 may be heated e.g. by means of a thermal oil heater and/or the rollers on the same side of the gap can be spaced from each other in a distance of ≥1 m to ≤2 m, for example, 1.5 m, wherein the belts 44, 46 may have a width in a range of about 1.5 m. According to FIG. 1 the carrier 20 which is located between the conveyor means 12, 14 is guided between the guide rollers 48, 50 and thus between the belts 44, 46, in particular steel belts. On the side of the belts 44, 46 opposite to the carrier 36 respectively pressing means and/or heaters 52, 54 are provided. These are adapted to heat as well as slightly compress the conveyor means 12, 14 and thus the carrier 36. For this purpose an air-heating can be provided and a plurality of rollers, which can allow for an intermittent pressing. Herein, a temperature in a range of up to 250° C. can act on the carrier 36. For example, the temperature can be in the range of ≥25° C. to ≤35° C. above the melting temperature or softening temperature of the carrier material or a part thereof. Furthermore, the pressure acting on the carrier 36 can be such that the carrier 36 is compressed in process step e) by a factor of ≤7.5%, preferably ≤5%, for example in a range of ≥0.1 mm to ≤0.2 mm. Herein, the pressing means and/or the heaters 52, 54 can occupy substantially the entire region between the guide rollers 48, 50 or only just a limited area along the conveying direction. After passing through the pressing means 40, the carrier may have a temperature in a range of about 190° C.

Herein, the pressing means 40 can have a variable pressure profile, such as starting with 6 mm and ending with 4.1 mm or advantageously be configured as an isochoric press.

According to FIG. 1 a cooling means 56 adapted to cool down the carrier to a temperature for example in the range of ≥35° C. is disposed downstream of the pressing means 40 in the conveying direction. Herein, the cooling means 56, for example, can be based on water cooling and include several cooling zones to allow for a defined cooling using precisely controllable cooling programs. The length of the cooling zone can correspond to the effective length of the pressing means 40. Downstream of the cooling device 56 another cooling belt can be provided.

After these steps the carrier, which may have a final thickness in a range of ≥3 mm to ≤5 mm, for example 4.1 mm, can immediately further processed or stored, e.g. as a web-like carrier 36 or as an already cut plate-shaped carrier.

At this point in the method according to the invention the further process steps follow:
g) optionally applying a decor subsurface onto at least a portion of the carrier 36,
h) applying a decor simulating a decoration template onto at least a portion of the carrier 36,
i) applying a protective layer onto at least a portion of the decor,
j) optionally texturing the protective layer, and
k) optionally treating the carrier 36 for inducing an electrostatic discharge prior to any one of the above-mentioned process steps.

REFERENCE SYMBOLS 10 apparatus
12 belt-like conveyor means
13 arrow
14 belt-like conveyor means
16 guide roller
18 receiving space
20 carrier material
22 discharge unit
24 discharge head
25 funnel
26 spreading roller
28 molding unit
30 molding means
32 molding means
34 heater
36 web-like carrier
38 pressing means
40 pressing means
44 steel belts
46 steel belts
48 guide roller
50 guide roller
52 heater
54 heater
56 cooling means
58 arrow
60 main roller
62 counter pressure roller
64 calender roller
66 guide roller

The invention claimed is:

1. Method for producing a decorated wall or floor panel, comprising the process steps of:
    a) providing a pourable carrier material which is granulate;
    b) placing the carrier material between two belt-like conveyor means;
    c) molding the carrier material under the influence of temperature while forming a web-like carrier;
    d) compressing the carrier;
    e) treating the carrier under the influence of temperature and pressure by use of a dual-belt press to compress the carrier by a factor of >0% up to 7%;
    f) cooling the carrier;
    g) applying a decor subsurface onto at least a portion of the carrier, said decor subsurface being formed from a liquid radiation curable mixture based on a urethane or urethane acrylate, optionally with one or more of a photo initiator, a reactive diluent, a UV stabilizer, a rheological agent, radical scavengers, leveling agents, antifoams, preservatives, pigment, and a dye, said liquid being applied to the carrier in an amount between >1 g/m$^2$ and <100 g/m$^2$;
    h) applying a decor simulating a decorative template onto at least a portion of the decor subsurface applied onto the carrier;
    i) applying a protective layer onto at least a portion of the decor;
    j) optionally texturing the protective layer for producing pores and/or the edge region of the carrier for forming connecting elements; and
    k) optionally treating the carrier for inducing an electrostatic discharge prior to any one of the above process steps.

2. The method according to claim 1, characterized in that the carrier material is based on a plastic material or based on a wood plastic composite material.

3. The method according to claim 2, characterized in that the carrier material is based on a WPC material comprising wood and polyethylene, wood and polypropylene, or wood and a copolymer of polyethylene and polypropylene.

4. The method according to claim 2, characterized in that the carrier material is based on a PVC material.

5. The method according to claim 1, characterized in that the carrier material comprises wood and/or chalk having a particle size between 0 and ≤600 μm and a particle size distribution of D50≥400 μm.

6. The method according to claim 1, characterized in that the carrier material comprises hollow microspheres.

7. The method according to claim 1, characterized in that the pourable carrier material has a full width half maximum of the particle size in a range of ≥1.8 mm.

8. The method according to claim 1, characterized in that a fiber material web, is incorporated into the carrier.

9. The method according to claim 1, characterized in that a temperature gradient is set in process step c).

10. The method according to claim 1, characterized in that process step d) is carried out by use of a S-roll, and is a separate operation from step (c) and performed after step (c).

11. The method according to claim 1, characterized in that the carrier is compressed in process step e) by a factor of >0% up to 5%.

12. The method of claim 1 wherein steps g, j, and k are affirmatively performed.

13. The method of claim 1 wherein each belt of the dual-belt press is guided by guide rollers which are spaced from each other by a distance of ≥1 m to ≤2 m.

14. The method of claim 1 wherein the carrier is compressed in step (e) by ≥1 mm to ≤2 mm.

15. The method of claim 1 wherein each belt of the dual-belt press is guided by guide rollers which are spaced from each other and there are heaters between the guide rollers on each side of the carrier.

16. The method of claim 1 wherein the subsurface formed from the liquid radiation curable mixture in step (d) consists of said urethane or urethane acrylate, optionally with one or more of the photo initiator, the reactive diluent, the UV stabilizer, the rheological agent, the radical scavengers, the leveling agents, the antifoams, the preservatives, the pigment, and the dye.

* * * * *

UNITED STATES PATENT AND TRADEMARK OFFICE
CERTIFICATE OF CORRECTION

| | | |
|---|---|---|
| PATENT NO. | : 10,059,072 B2 | Page 1 of 1 |
| APPLICATION NO. | : 14/419798 | |
| DATED | : August 28, 2018 | |
| INVENTOR(S) | : Hans-Jürgen Hannig | |

It is certified that error appears in the above-identified patent and that said Letters Patent is hereby corrected as shown below:

On the Title Page

Item (73), Assignee:
"AKZENTA PANEALE + PROFILE GMBH"
Should read:
-- AKZENTA PANEELE + PROFILE GMBH --.

Signed and Sealed this
Sixth Day of November, 2018

Andrei Iancu
*Director of the United States Patent and Trademark Office*